Aug. 17, 1926.  1,596,332
W. O. BENTLEY ET AL
SHAFT DRIVING MECHANISM
Filed August 13, 1923    3 Sheets-Sheet 1

Inventors
W. O. Bentley
F. T. Burgess
By
Watson, Coit, Morse & Grindle
Att'ys

Aug. 17, 1926. 1,596,332

W. O. BENTLEY ET AL

SHAFT DRIVING MECHANISM

Filed August 13, 1923  3 Sheets-Sheet 2

Inventors
W. O. Bentley
F. T. Burgess
By
Watson, Coit, Morse & Grindle.
Atty's.

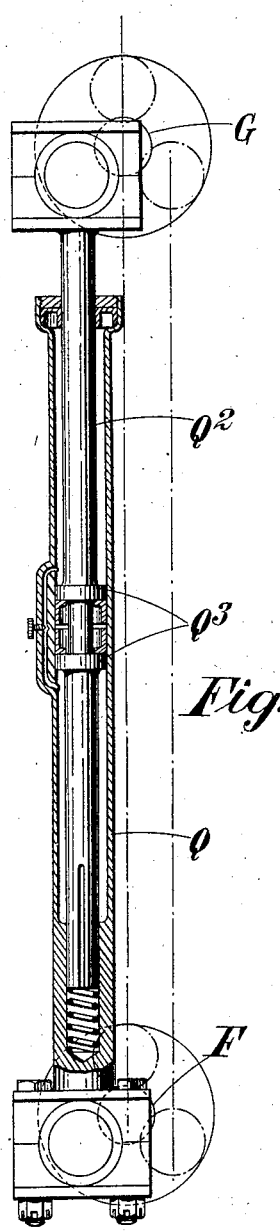

Patented Aug. 17, 1926.

1,596,332

UNITED STATES PATENT OFFICE.

WALTER OWEN BENTLEY AND FREDERICK TASKER BURGESS, OF LONDON, ENGLAND.

SHAFT-DRIVING MECHANISM.

Application filed August 13, 1923, Serial No. 657,213, and in Great Britain December 21, 1922.

This invention relates to shaft driving mechanism, and is mainly intended for use on internal combustion engines for operating overhead cam shafts thereon. The type of mechanism is that in which two or more cranks or eccentrics spaced around the driving shaft are severally connected by hinged links with a corresponding plurality of cranks or eccentrics around the driven shaft, and the principal object of the invention is to provide a simple and silent form of drive wherein the effect of cylinder expansion in altering the distance apart of the driving and driven shafts is automatically compensated. A further object is to provide in a simple manner for the accurate adjustment of the links with a view to avoiding any binding action in the drive.

According to this invention, each link comprises two telescopic or equivalently connected parts which are provided with means, resilient or otherwise and preferably adjustable, for limiting their movement towards and/or away from one another. Thus there may be simply an adjustable abutment upon the one engageable by a co-operating surface upon the other, so that the drive is transmitted merely by a pushing action of each link, or combined with this there may be a spring which tends to extend the link during its idle movement and avoids shock upon the abutment when the extension is again taken up by the drive. In each case provision is made for a change in the distance apart of the shafts arising through expansion or other effects.

Alternatively the extension and contraction of the link can be yieldingly resisted in both directions by springs, dashpots or equivalent devices, preferably with means for adjusting their loadings.

Figure 1:
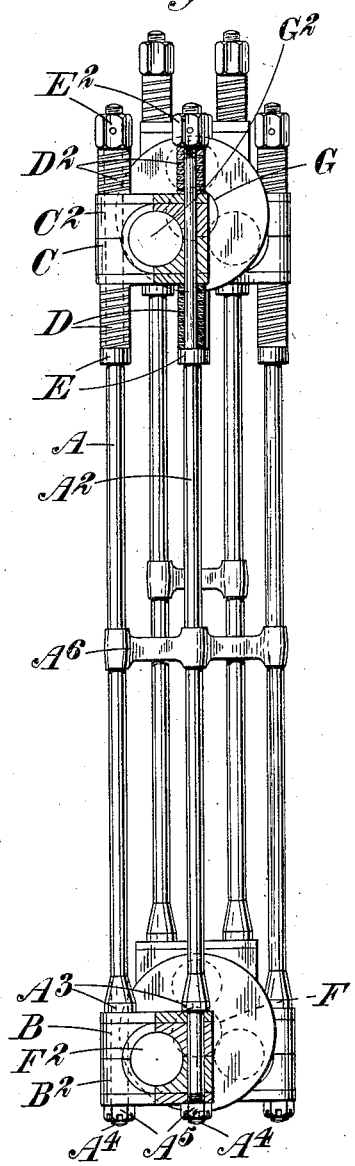
Figure 2:
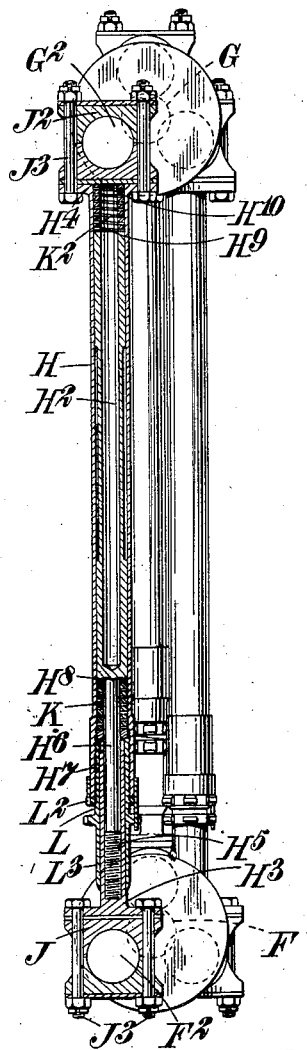
Figure 3:
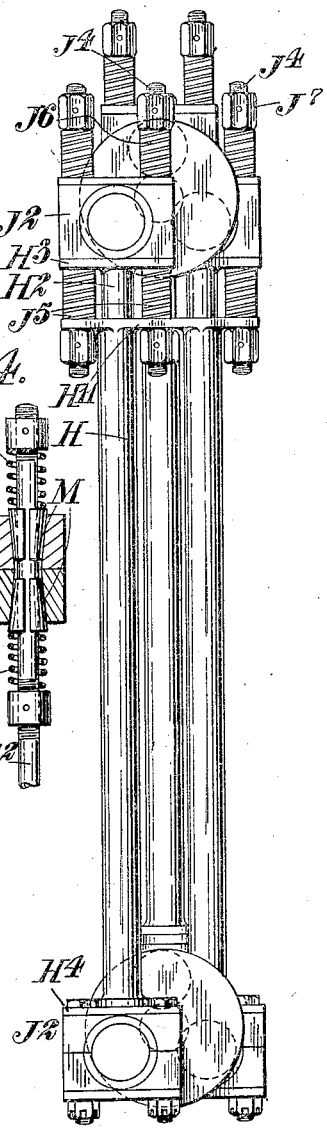
Figure 4:
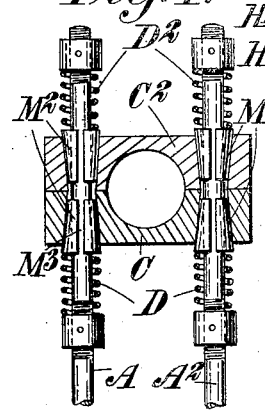
Figure 5:
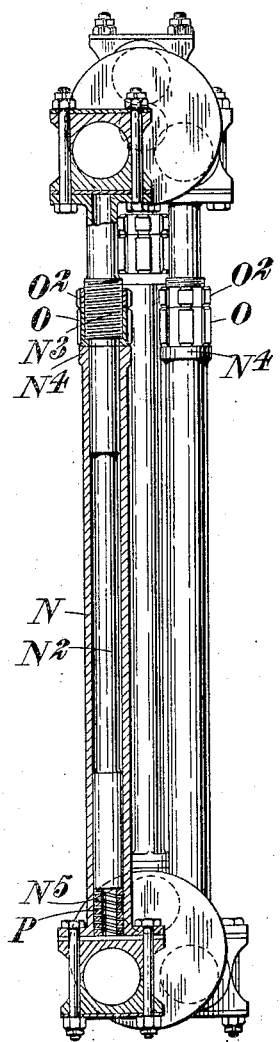

The manner of carrying out the invention is illustrated in the accompanying drawings, in which Figure 1 is a part-sectional elevation of one construction, Figure 2 is a part sectional elevation of a modified construction, Figure 3 is an elevation of a further modification combining certain of the features shown in both Figures 1 and 2, Figure 4 is a sectional elevation of a part of the link with certain features applicable to the construction shown in both Figures 1 and 3, Figure 5 is a part-sectional elevation of a further modification, and Figure 6 is a diagrammatic illustration showing the use of a fluid dashpot in place of a spring for controlling extension and/or contraction of the link.

Like letters indicate like parts throughout the drawings.

In each construction the driving shaft is shown at F and the driven one at G (or vice versa) and each carries cranks or eccentrics $F^2$ and $G^2$ coupled together by links, so that the rotary motion of one shaft is transmitted to the other in the well-known manner. Where the driven shaft is a camshaft which rotates at half the speed of the engine crankshaft, the driving shaft F would be geared to the crankshaft by toothed gearing of the corresponding ratio.

In the construction shown by Figure 1, each link is constituted by a pair of rods A, $A^2$, arranged side by side, and at one end extending through the two parts B, $B^2$ of a divided bearing forming one eye of the link and constituting for this the connecting bolts, the rods being provided with shoulders $A^3$ and their extremities $A^4$ being threaded to receive the nuts $A^5$ which tighten the parts of the bearing up against the shoulders.

At the opposite end a similar pair of bearings C, $C^2$ constitute the other eye of the link, but these are slidably mounted upon the two rods A, $A^2$ to allow for their freedom of movement, and also for their initial adjustment as to the distance apart of the eyes of the link. On each side of the sliding bearings coil springs D, $D^2$ are mounted upon the rods and are located in each case between the bearing and fixed and adjustable abutments respectively, such as the collars E and the nuts $E^2$ screw-threaded upon the rods A, $A^2$. It will be evident, therefore, that by adjusting these nuts $E^2$ along the rods, the link can be brought to the desired effective length, while at the same time the springs D, $D^2$ will be given their appropriate loading. Any suitable means are employed to lock the nuts $E^2$ after adjustment, and the normal length of the links can be readily checked in the first instance by means of a jig.

By the foregoing arrangement it will be seen that the link is both resiliently extensible and compressible, so that a very smooth drive is transmitted and any change in the distance apart of the centres of the driving and driven shafts (indicated respectively by F and G, with cranks $F^2$, $G^2$) through expansion or other causes which arise in the driving of an overhead camshaft of an internal combustion engine is automatically met by a change in the length of the link, so that binding in the drive is avoided.

To minimize weight, the two rods A, $A^2$ are of relatively small diameter, and to avoid their buckling under a compressive load they may be stiffened and tied to one another by ties such as $A^6$.

In a more elaborate method of carrying out the invention illustrated by Figure 2, the link is telescopic, comprising two members H, $H^2$ (the inner preferably tubular as well as the outer) sliding one within the other, and each at its outer end provided with a bearing or eye to engage respectively with the cranks $F^2$, $G^2$. Preferably the tubular rods are T-ended as at $H^3$, $H^4$, so as to have attached to them divided bearings J, $J^2$ forming the eyes and secured by a pair of bolts $J^3$ spaced apart in the known manner, thereby providing a sound mechanical construction.

The T-end portion $H^3$ for the inner member $H^2$ of the link is preferably formed separately and is attached by providing in it a screw-threaded socket $H^5$ engaged by a correspondingly screw-thread end of a reduced part $H^6$ on the member $H^2$. This reduction is made for a considerable distance beyond the end of the socket $H^5$ and provides for the mounting upon the reduced part of a compression spring K before the T part is attached. This compression spring is located within the outer tubular member H, the mouth of which is counterbored at $H^7$ for the reception of a threaded sleeve L forming an adjusting nut which is adapted to bear upon the end of the spring K to thrust it against the shoulder $H^8$ formed by reducing the member $H^2$. Between the inner end $H^9$ of the member $H^2$ and the inner end $H^{10}$ of the tubular member in which it slides is located another compression spring $K^2$, preferably of similar diameter and strength to the spring K. It will be evident, therefore, that when the adjusting sleeve nut L is screwed up it will bear against the spring K, which in turn bears against the shoulder $H^8$ formed by reducing the inner rod, and this latter, therefore, will be thrust down against the spring $K^2$ bearing against the inner ends of the outer rod. Thus the two springs K, $K^2$, will act in opposition to one another with equal and opposite forces which tend to resist either extension or contraction of the link. A locking nut $L^2$ may be provided to lock the adjusting sleeve nut L, and the latter may have a tubular portion $L^3$ which extends in the opposite direction to its threaded part to embrace the outside of the socket $H^5$, thereby to stiffen the joint.

It will be seen that with the latter arrangement, only two springs are required for each link as against four for the first described construction, and a compact and simple method of adjusting the distance apart of the centres of the link is provided. It will also be seen that in an adjustment of this nature the load upon the springs will be equalized, and a resilient push and pull will result in the driving action.

The first described construction, however, besides being light is relatively inexpensive to manufacture, while all the springs are visible so that the degree of their loading and the amount by which they can yield without becoming solid is readily ascertained. In the second construction, only half the number of springs employed in the first mentioned is required, but they are not visible. The construction, however, is of a much more substantial nature.

In the construction shown by Figure 3, certain of the features shown in Figures 1 and 2 respectively are combined, and for convenience, therefore, similar reference letters are employed for the like parts. Telescopic members H, $H^2$ with T-ends $H^3$, $H^4$ carry the bearings J and $J^2$. The member H has an additional T-end $H^{11}$ at the end opposite to $H^4$, and through this extend the bolts $J^4$ which serve to connect the bearing $J^2$ to the T-end $H^3$. Between the T-ends $H^3$ and $H^{11}$ are located compression springs $J^5$, and similar compression springs $J^6$ are employed on the other side of the bearing $J^2$, all arranged upon the bolts $J^4$, so that a resilient push and pull effect is obtained in the drive, and by tightening up the nuts $J^7$ upon these bolts the springs $J^5$ and $J^6$ are loaded and the effective length of the link is adjusted.

Where the connecting links are arranged with the bearings slidably mounted upon the two rods, as shown in Figure 1, or upon the bolts $J^4$ in Figure 3, it may be desirable to provide a braking action to damp the movements of the sliding parts. Figure 4 shows the braking device applied to the construction illustrated by Figure 1. The holes in the bearings C, $C^2$, through which the rods A, $A^2$ extend, are each bushed from opposite ends with a split sleeve M having a conical exterior surface engaging a correspondingly coned hole in the bearings. The springs D, $D^2$ would bear upon the large ends $M^2$ of these coned bushes tending to thrust them into the holes provided for them, so that thereby they are contracted at the split $M^3$ and grip the rods A, $A^2$ upon which they slide, thereby exerting a braking action upon the sliding movements of the bearings upon the rods. The effect, therefore, is that of a shock absorber with an automatic damping action adapted to eliminate any tendency to rattle if wear develops in the bearing surfaces.

It will be evident, therefore, that by the foregoing arrangement, even if the springs were compressed so tightly as to give a substantially solid drive under working conditions, the sliding effect for adjustment of the length of the link could still take place under a heavy load, such as might arise through expansion effects in altering the distance apart of the driving and driven shafts, and none the less, therefore, while obtaining the advantages of the automatic adjustment in length, the conditions would resemble that of a solid drive.

In view of the fact that the connecting links are adapted to exert both a push and a pull in the transmission of the drive, it will be evident that as few as two cranks or eccentrics with their associated connecting links may be employed to constitute the driving connection, the cranks preferably being arranged at right angles to one another.

In the modified construction illustrated by Figure 5, the links are adapted to transmit a push only. The link, as in Figure 2, is formed in two parts N, $N^2$, of which the part N is tubular for a part, or the whole length, while the other one $N^2$ may also be tubular for lightness, and is adapted to slide freely within the first, forming thereby a telescopic joint. The part $N^2$ is screw-threaded externally at $N^3$ and is provided with an adjusting nut O locked by the nut $O^2$ adapted to bear against the end $N^4$ of the part N of the link within which it slides. If preferred this part of the link may be slightly thickened at the end to form an abutment having a suitable amount of surface to take the thrust which is transmitted through the link.

With the foregoing arrangement, it will be evident that the effective length of the link can readily be adjusted by means of the aforesaid nut or nuts, and if the link is appropriately adjusted when the engine is cold, any movement apart of the shaft centres when the engine heats up will be compensated by a corresponding extension in the link at the telescopic joint.

To avoid any shock between the nut O and the adjacent end $N^4$ forming the fixed abutment on the part N, it is preferred to provide a compression spring between the two parts of the link, thereby resiliently to thrust the two parts of the link apart, thus taking up all slack arising from clearance caused by expansion or the like and ensuring smoothness in driving. A preferred arrangement is to locate the spring P within the inner end of the part N, so that the adjacent end of the part $N^2$ can bear against it.

With a view to setting the adjustable abutment in such manner that the effective length of each of the links is alike, means may be provided for temporarily locking the cam shaft and the driving shaft in fixed angular relationship with one another during such adjustment. This may be effected by providing a notch in the driving and the driven shafts, preferably in the periphery of a disc provided on each, and employing a detent, which may be a sliding plunger in each case, to engage the notch in the disc. Thus these plungers would be mounted on a fixed part adjacent each shaft, and when moved axially would engage the shaft in such manner as to lock it. The shafts would thus be held firmly in their correct angular relationship with one another, and each of the links could then be adjusted for effective length in such manner that they would all be alike. Obviously such adjustment could be best effected when the line of the link is at right angles to the cranks which it couples, and if desired, as many notches might be provided around the disc as there were cranks employed, so that each link could then be brought into the most favourable position for adjustment.

By a suitable modification of the telescopic construction of the link, the interior of the outer tubular rod may constitute the cylinder of a fluid dashpot, as shown in Figure 6, where the inner rod $Q^2$ is provided with a piston $Q^3$ which slides freely within the part Q of the link and is acted upon on both sides by fluid (preferably oil) pressure, thereby progressively to vary its resistance to extension or compression.

In either of the foregoing constructions, it will be seen that the invention provides not only for changes of centres of the driving and the driven shafts, but ensures that the drive transmitted by the links will be of a resilient nature and capable of exerting both a push and a pull, or a push only, in the drive. The mechanism of the link is of a simple and effective nature and can easily be assembled.

The invention constitutes also an inexpensive form of driving mechanism for two shafts which rotate at similar speeds, and it will be evident that as the effective length of the link is a matter of adjustment, the parts of the link can be manufactured so as to suit engines in which variations exist in the distance apart of the driving and driven shafts.

What we claim as our invention and desire to secure by Letters Patent of the United States is:—

1. In a shaft driving mechanism, the combination of a driving shaft, a driven shaft, cranks spaced around said driving shaft, cranks spaced similarly around said driven shaft, links connecting said cranks of the one shaft with corresponding cranks of the other shaft, mechanism compensating for changes in distance between driving and driven shafts comprising a joint in each of said links permitting an automatic alteration in its effective length, and means for limiting the extent of such alteration, substantially as set forth.

2. In a shaft driving mechanism, the combination of a driving shaft, a driven shaft, cranks spaced around said driving shaft, cranks spaced similarly around said driven shaft, links connecting said cranks of the one shaft with corresponding cranks of the other shaft, mechanism compensating for changes in distance between driving and driven shafts comprising a joint in each of said links permitting an alteration in its effective length while in motion, and means adapted yieldingly to resist such alteration in length, substantially as set forth.

3. In a shaft driving mechanism, the combination of a driving shaft, a driven shaft, cranks spaced around said driving shaft, cranks spaced similarly around said driven shaft, links connecting said cranks of the one shaft with corresponding cranks of the other shaft, mechanism compensating for changes in distance between driving and driven shafts comprising a joint in each of said links, constituted by forming it of two parts which slidably engage one another thereby to permit an automatic alteration in the effective length of said link, and means adapted yieldingly to limit such alteration in length, substantially as set forth.

4. In a shaft driving mechanism, the combination of a driving shaft, a driven shaft, cranks spaced around said driving shaft, cranks spaced similarly around said driven shaft, links connecting said cranks of the one shaft with corresponding cranks of the other shaft, mechanism compensating for changes in distance between driving and driven shafts comprising a joint in each of said links, constituted by forming it of two parts which slidably engage one another thereby to permit an alteration in the effective length of said link while in motion, means adapted yieldingly to limit such alteration in length, and a braking device acting upon said sliding parts, the loading of which is increased by the axial load upon the link, substantially as set forth.

5. In a shaft driving mechanism, the combination of a driving shaft, a driven shaft, cranks spaced around said driving shaft, cranks spaced similarly around said driven shaft, links connecting said cranks of the one shaft with corresponding cranks of the other shaft, mechanism compensating for changes in distance between driving and driven shafts comprising a joint in each of said links permitting an alteration in its effective length, and means for limiting the extent of such alteration comprising coil springs resiliently opposing alteration in each direction, and positively limiting alteration beyond a predetermined extent by the springs becoming solid.

6. In a shaft driving mechanism, a driving shaft, a driven shaft, cranks spaced around said driving shaft, cranks spaced around said driven shaft, links connecting the cranks of one shaft with corresponding cranks of the other shaft and mechanism operatively connected to each of said links to automatically alter its length in compensation for changes in distance between the driving and driven shafts.

In testimony whereof we have signed our names to this specification.

WALTER OWEN BENTLEY.
FREDERICK TASKER BURGESS.